United States Patent
Pate

(10) Patent No.: US 6,257,125 B1
(45) Date of Patent: Jul. 10, 2001

(54) SELF LEVELING, NO SPILL, COOKING STOVE

(76) Inventor: Joel R. Pate, Box 43, Highway 42 West, Brooklyn, AL (US) 36429

( * ) Notice: Subject to any disclaimer, the term of this patent is extended or adjusted under 35 U.S.C. 154(b) by 0 days.

(21) Appl. No.: 09/740,744

(22) Filed: Dec. 19, 2000

(51) Int. Cl.[7] .............................. A23L 1/00; A47J 37/00; F24C 15/30
(52) U.S. Cl. ................... 99/339; 99/340; 99/448; 99/450; 99/482; 126/9 R; 126/25 R; 126/24
(58) Field of Search ............................ 99/339, 340, 337, 99/338, 403–418, 444–450, 481, 482; 126/24, 25 A, 25 R, 39 R, 38, 50, 9 R, 9 B; 211/80, 81, 175; 248/278.1, 311.2, 172; 114/91; 431/343

(56) References Cited

U.S. PATENT DOCUMENTS

| | | | |
|---|---|---|---|
| 2,475,499 | 7/1949 | Hearst | 158/42 |
| 2,520,412 | 8/1950 | Jensen | 248/278.1 X |
| 3,611,915 | 10/1971 | Glaser et al. | 99/446 X |
| 3,734,076 | 5/1973 | Kiziol | 126/25 R |
| 4,093,166 | 6/1978 | Lida | 248/126 |
| 4,445,495 | 5/1984 | Frost | 248/311.2 |
| 4,453,530 | 6/1984 | Schlosser | 220/379 X |
| 4,456,819 | 6/1984 | Ballard | 219/391 |
| 4,523,574 | 6/1985 | Schlosser | 126/41 R |
| 4,653,462 | 3/1987 | DeFoe | 211/175 X |
| 4,700,618 | 10/1987 | Cox, Jr. | 99/340 X |
| 4,776,318 | 10/1988 | Serra et al. | 126/9 R |
| 4,962,697 | 10/1990 | Farrar | 99/448 X |
| 5,016,607 | 5/1991 | Doolittle et al. | 126/25 R |
| 5,195,423 | 3/1993 | Beller | 99/450 X |
| 5,467,692 | 11/1995 | Perez, III | 99/340 |

Primary Examiner—Timothy F. Simone
(74) Attorney, Agent, or Firm—Waddey & Patterson, P.C.; John C. Garvin, Jr.

(57) ABSTRACT

A portable stove that is especially useful for marine and recreational vehicle use in that the cooking vessel (pot or pan) holding the food or liquid is gimbaled to swing about perpendicular axes to remain upright despite substantial rolling or pitching of the marine vehicle and the movement of the recreational vehicle to prevent the spilling of the contents of the cooking vessel. The portable stove generally comprises a gimbal ring having two sets of gimbals or bearings therearound, a frame associated with one set of gimbals or bearings for pivotally supporting the gimbal ring, a hanger assembly associated with the other set of the gimbals or bearings and being pivotally supported by the gimbal ring, a fuel supply tank positioned within a basket formed in the hanger assembly, a burner assembly connected with the fuel supply tank, and a pedestal within the vehicle, associated with the frame for normally maintaining the frame in a vertical position. The structure of the portable stove is such that the axis of the pedestal and the axis of the gimbal ring are in vertical alignment.

10 Claims, 4 Drawing Sheets

SELF LEVELING, NO SPILL, COOKING STOVE

FIELD OF THE INVENTION

This invention relates generally to a portable cooking stove for use in motion filled, non-stable, environments such as boats, ships, and recreational vehicles. More particularly, the present invention relates to a small stove that is especially suitable for marine use in that the vessel or container, (usually a pot or pan) holding the food or liquid to be cooked or warmed is gimbaled to swing about perpendicular axes to remain upright despite substantial rolling or pitching of the boat and the movement of the recreational vehicle to prevent the spilling of the food being cooked or warmed.

BACKGROUND OF THE INVENTION

The prior art includes numerous small stoves which are gimbal mounted to enable the vessel or container (pot or pan) holding food or liquid to remain upright during rolling or pitching of a boat or movement of a recreational vehicle. A principal consideration for such a stove is safety to minimize potential fire hazards and the possibility of persons near the stove burning themselves by contact with hot parts or from spillage of material from the container, pot or pan. Several such patents are disclosed in United States patents as exemplified by U.S. Pat. No. 2,520,412 to Jensen; U.S. Pat. No. 4,445,495 to Frost; U.S. Pat. No. 4,653,462 to DeFoe; and U.S. Pat. No. 4,776,318 to Serra.

The Jensen patent discloses a cooking apparatus for a ship that will maintain the cooking container horizontal while the ship pitches or rolls. The cooking apparatus of Jensen is supported from a vertical wall of a galley and is provided with rotary supports vertically and horizontally disposed and adapted for holding a cooking container (pot or pan) horizontally when the ship pitches or rolls. The Frost patent discloses a cooking stove that is supported from a bulkhead (vertical wall) and is suitable for marine use in that its cooking container is gimbaled to swing about perpendicular horizontal axes to maintain the cooking container upright and horizontal notwithstanding the tilting of the bulkhead. The DeFoe patent discloses a galley stove having a gimbal mounting to accommodate the roll and pitch of a ship or boat on which the stove is used. The Serra patent discloses a portable cooking device having retainer means for partially surrounding a pot or pan above a burner to prevent the pot or pan from sliding from the cooking device.

While there are numerous cooking stoves for use in a motion filled, non-stable, environment such as boats, ships and recreational vehicles, most are complex, and all suffer from numerous deficiencies and disadvantages. The present invention overcomes these deficiencies and disadvantages in that it fills the needs for a simple, inexpensive, stove that can be used for cooking and warming purposes and can be easily mounted to existing or modified structures within boats, ships, and recreational vehicles.

SUMMARY OF THE INVENTION

In accordance with the present invention there is provided a portable cooking stove that is especially suitable for marine and recreational vehicle use in that the vessel or container, (pot or pan) holding food or liquid to be cooked or warmed is gimbaled to swing about perpendicular axes to remain upright despite substantial rolling or pitching of a marine vehicle and the movement of a recreational vehicle to prevent the spilling of the food being cooked or warmed.

The portable stove of the present invention generally comprises a gimbal ring having two sets of gimbals or bearings therearound, a frame associated with one set of gimbals or bearings for pivotally supporting the gimbal ring, a hanger assembly associated with the other set of the gimbals or bearings and being pivotally supported by the gimbal ring, a fuel supply tank mounted within a basket formed in a lower section of the hanger assembly, a burner assembly connected with the fuel supply tank, a cooking pot or pan within the hanger assembly, and means, such as a pedestal or opening within the marine or recreational vehicle, associated with the support frame for normally for maintaining the support frame in a vertical position. The structure of the cooking stove of the present invention is such that the axis of the pedestal or opening within the marine or recreational vehicle and the axis of the gimbal ring are in vertical alignment.

Accordingly, it is an object of the present invention to provide a portable cooking stove made of readily available, inexpensive, materials for preventing the spillage of the food or liquid being cooked or warmed by the stove.

It is a further object of the present invention to provide a portable cooking stove which incorporates gimbal mechanisms which allow the pot or pan holding the food or liquid to remain in a substantial level position if there is any movement, pitching or rolling of the vehicle supporting the portable cooking stove.

It is yet a further object of the present inventor to provide a portable cooking stove which incorporates retainer means which prohibit a pot or pan from sliding if the pot or pan had a tendency to slide.

It is still a further object of the present invention to provide a portable cooking stove of simple construction and made of readily available materials, which further incorporate a shield for making its burner less susceptible of being extinguished by wind gusts.

These objects as well as other objects of the invention will become more readily apparent from the following description in conjunction with the accompanying drawings.

DESCRIPTION OF THE PREFERRED EMBODIMENT

Figure 1:
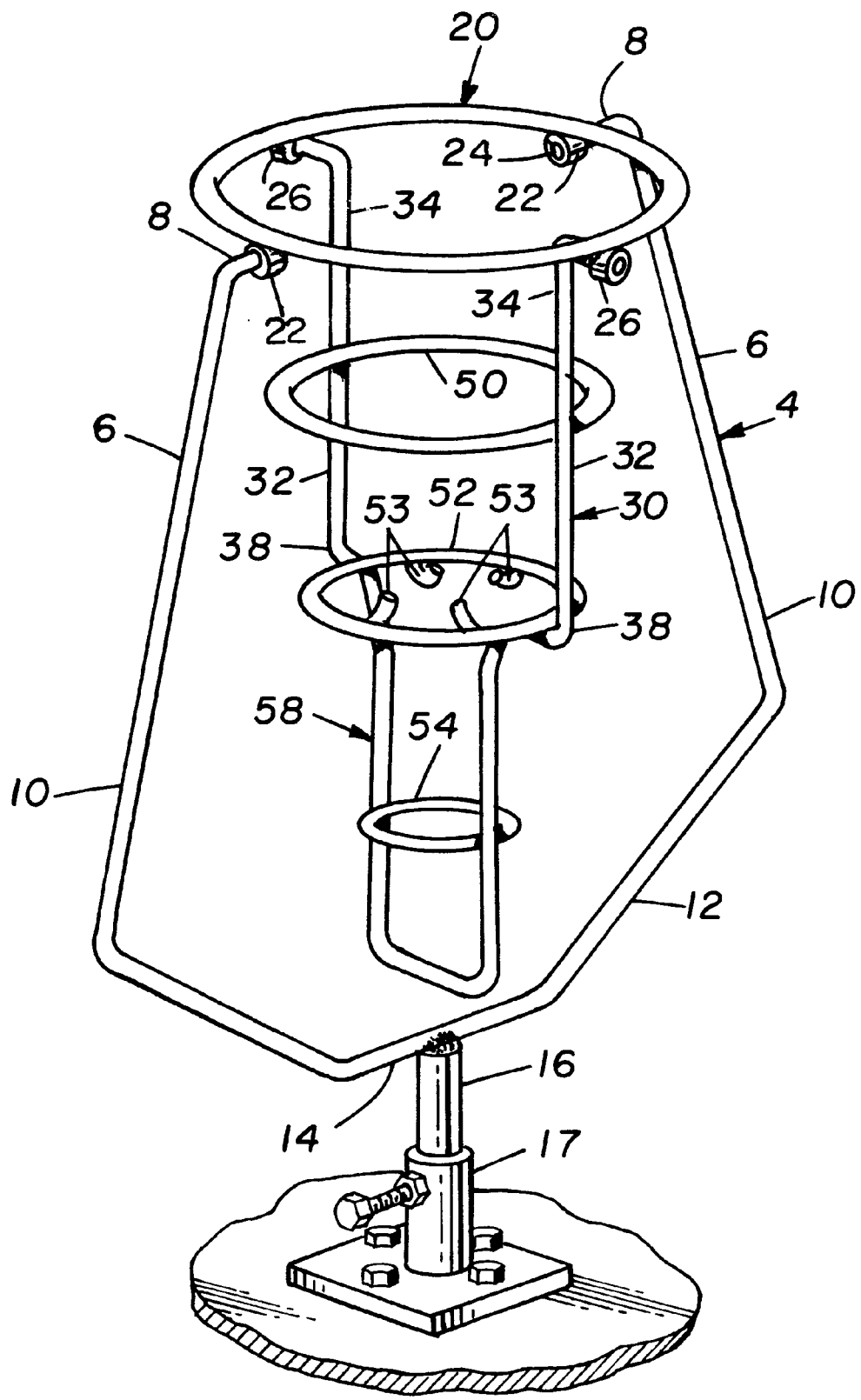
FIG. 1 is a perspective view of the portable cooking stove of the present invention minus the cooking pot, the wind shield, and the burner assembly, mounted in an upstanding, vertically disposed, pedestal of a boat which normally supports a removable boat seat.
Figure 2:
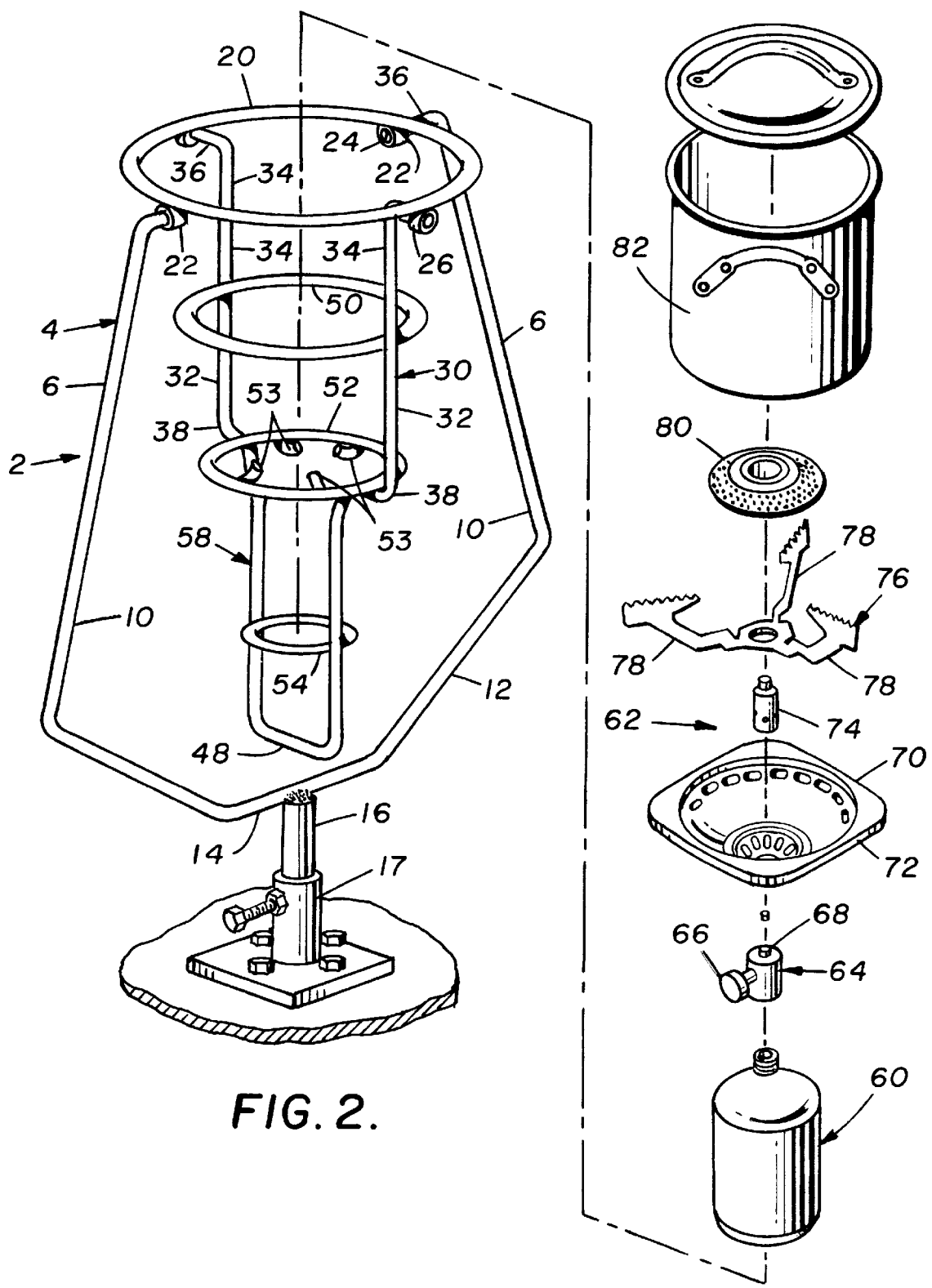
FIG. 2 is an exploded, perspective, view of the portable cooking stove of the present invention minus the wind shield shown mounted in an upstanding, vertically disposed, pedestal of a boat which normally supports a removable boat seat.
Figure 3:
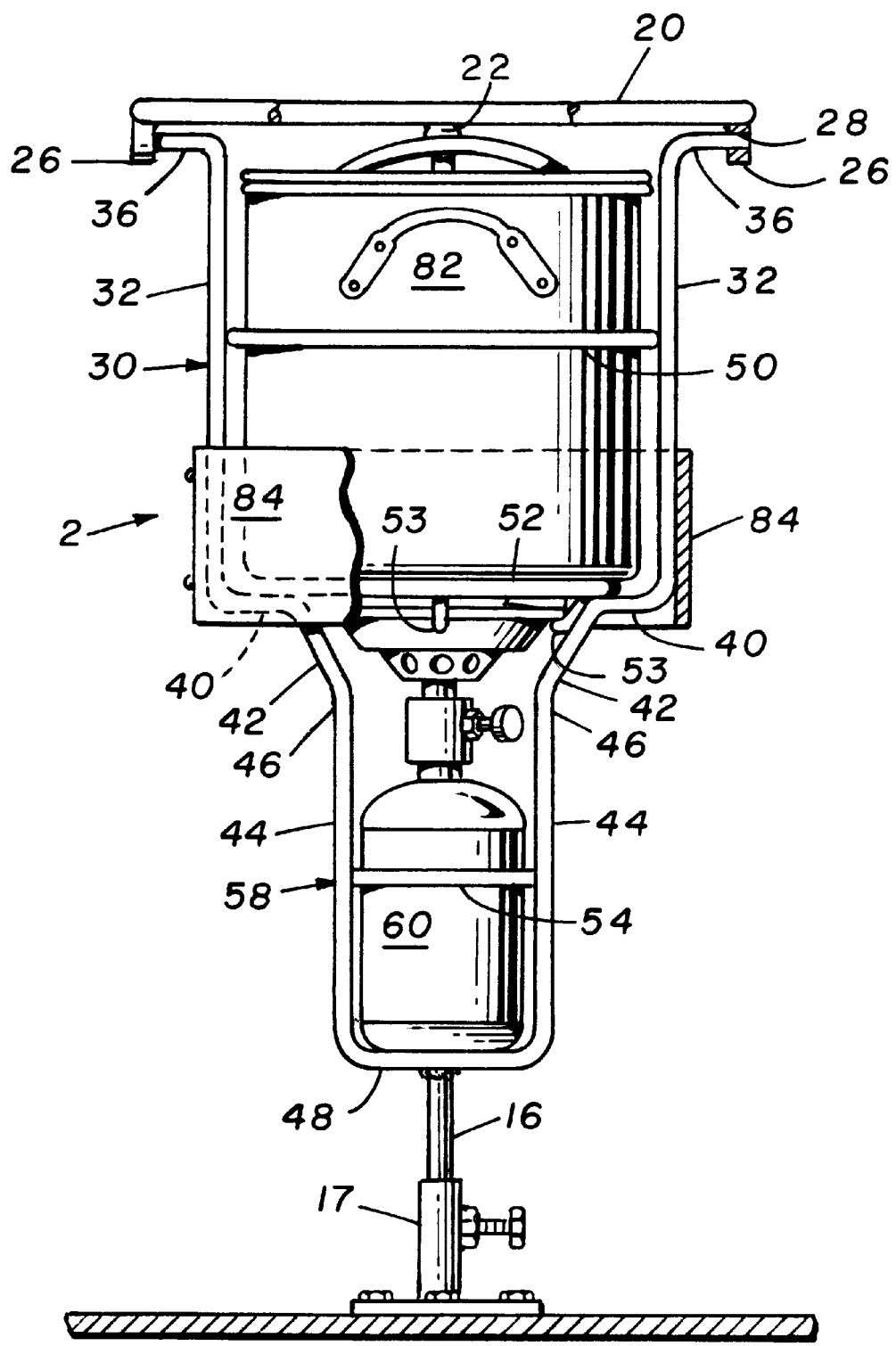
FIG. 3 is a side elevational, partially broken away and in cross section, view of the portable cooking stove of the present invention and which includes the fuel supply tank, the burner assembly, wind shield, and a cooking pot or pan with a cover.

Referring now to the drawings, wherein like numerals represent like parts, reference numeral 2 generally designates the portable cooking stove of the present invention. Referring now to FIGS. 1–3, stove 2 generally comprises a support frame 4, a gimbal ring 20, a hanger assembly 30, a fuel supply tank 60, a burner assembly 62, a cooking pot or pan 82 (FIGS. 2 and 3), and a pedestal or opening 17 for supporting the stove 2.

As best seen in FIGS. 1 and 2, support frame 4 includes a pair of side members 6 having inturned upper protrusions 8 and lower sections 10, a bottom section 12 integral with the lower sections 10 of the side members 6 and having an intermediate area 14, and a stem 16 secured to the intermediate area 14 of bottom section 12. As shown, the support frame 4 is made from a single piece of steel rod except for the stem 16 which is secured by a weld or any other suitable means to the intermediate area 14 of the bottom section 12.

As best seen in FIGS. 1–3, gimbal ring 20 is preferably made of one-piece from a steel rod, is circular, and includes a pair of first gimbals or bearings 22 spaced one hundred eighty degrees (180°) from each other, a pair of second gimbals or bearings 26 spaced one hundred eighty degrees (180°) from each other, with adjacent first and second gimbals 22 and 26 being respectively spaced ninety degrees (90°) around the gimbal ring 20. Each of the first gimbals or bearings 22 has an opening 24 therein and each of the second gimbals or bearings 26 has an opening 28 (FIG. 3) therein for purposes to be later explained.

As best seen in FIGS. 1 and 2, hanger assembly 30 includes a pair of legs 32, each having an upper section 34 with an outturned upper protrusion 36 (FIGS. 1 and 3); an intermediate section 38 having a first segment 40 (FIG. 3) formed perpendicular to upper section 34, a second segment 42 (FIG. 3) formed at approximately forty-five (45°) degrees to first segment 40; a lower section 44 (FIG. 3) connected at its upper end 46 to the second segment 42 at approximately forty-five (45°) degrees; and a bottom element 48. As shown, the legs 32, bottom element 48 and their sections, protrusions and segments, as previously discussed herein of the hanger assembly 30 is preferably made in one-piece from a steel rod. As best seen in FIGS. 1–3, the hanger assembly 30 further includes a first circular ring 50, preferably made of a steel rod, secured to the upper section 34 of each leg 32 by a weld or any other suitable means, a second circular ring 52, preferably made of a steel rod secured to the first segment 40 (FIG. 3) of the intermediate section 38 by a weld or any other suitable means, a plurality of hooks 53 (FIGS. 1–4) extending inwardly from second circular ring 52, a third circular ring, 54 preferably made of a steel rod, secured to the lower section 44 by a weld or any other suitable means. As best seen in FIGS. 1–3, a basket 58 is formed by the lower section 44, third circular ring 54, and bottom element 48 of the hanger assembly 30 for receiving a fuel supply tank 60, preferably a small propane tank with a small neck (unnumbered) with external threads (not shown) thereon.

Figure 5:
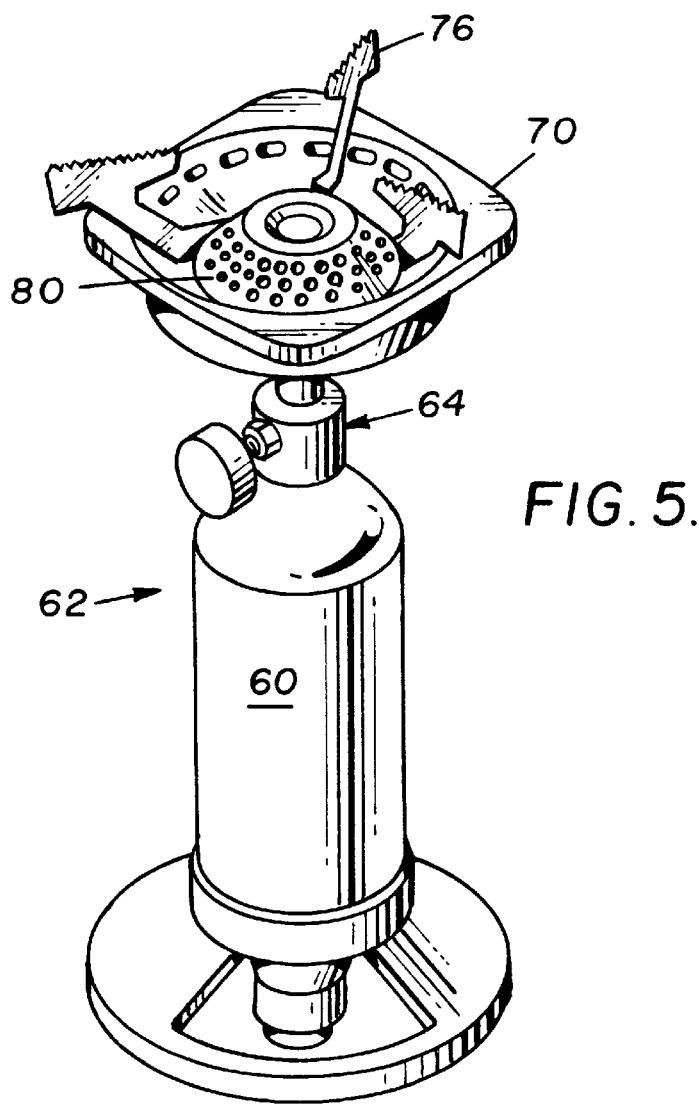
FIG. 5 is a perspective view of a conventional fuel supply tank and burner assembly, which is commercially and readily available in the open market and capable of use in the cooking stove of the present invention.

As best seen in FIGS. 2 and 5, burner assembly 62 includes a valve/orifice assembly 64, a burner base 70, an air mixer 74, a grate 76, and a burner 80. The valve/orifice assembly 64 has an intermediate section (unnumbered) with a control knob 66 thereon, an upper section (unnumbered) having a reduced portion 68 with external threads (unnumbered), and a lower section (unnumbered) having a bore (not shown) with internal threads (not shown) for threadly attaching the valve/orifice assembly 64 to the external threads (not shown) on the small neck unnumbered of fuel supply tank 60. Burner base 70 has a central opening (unnumbered) for mounting on the reduced portion of the upper portion of the valve/orifice assembly 64, and a lip 72 (FIG. 2) on its outer periphery. The air mixer 74 has a bore (not shown) at its lower end (unnumbered and not shown), and a reduced portion (not shown) at its upper end (unnumbered). The air mixer 74 is secured by its external threads at its lower end to the external threads on the reduced portion of the valve/orifice assembly 64, thus securing the burner base 70 to the valve/orifice assembly 64. The grate 76 (FIG. 2) has a central opening (unnumbered) and three arms 78. The central opening of the grate 76 is mounted on the reduced portion of the air mixer 74. The burner 80 has a plurality of fuel emitting openings (unnumbered) therein and a centrally located, internally threaded, bore for attachment to the external threads on the reduced portion of the air mixer 74.

The fuel supply tank 60 and burner assembly 62, as best shown in FIG. 5, might be assembled from readily available commercial items, but we have found that the Model 2058 Single Burner "Trail Scout" stove manufactured and/or distributed by Century Tool & Manufacturing Company, Inc., 1462 U.S. Route 20 Bypass, P.O. Box 188, Cherry Valley, Ill. 61016-0188, and as actually depicted in FIG. 5, is suitable for use in the present invention.

Figure 4:
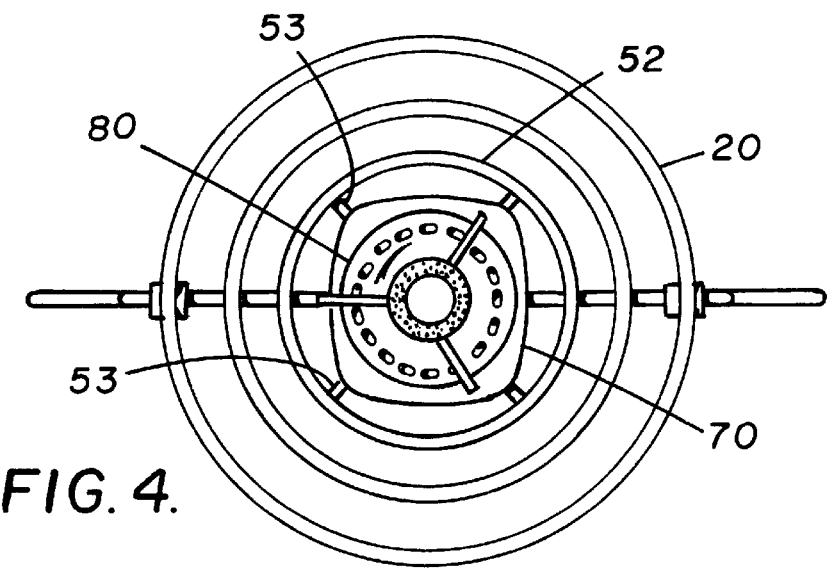
FIG. 4 is a top plan view of the portable cooking stove of the present invention minus the cooking pot or pan and the wind shield.

The portable, self leveling, no spill, stove 2 as depicted in the drawings might be assembled in the following steps as well as other possible steps.

a. As best seen in FIGS. 1 and 2, the inturned protrusions 8 of the frame 4 are inserted into respective openings 24 of the two first gimbals or bearings 22 secured to the gimbal ring 20. Due to the resiliency of the side members 6 of the frame 4, this can be easily accomplished.

b. As best seen in FIG. 1–3, the outturned protrusions 36 of the assembled hanger assembly 30 are next inserted into respective openings 28 of the two gimbals or bearings 26 secured to the gimbal ring 20. Due to the resiliency of the legs 32 of the hanger assembly 30, this can be easily accomplished.

c. As best seen in FIGS. 2–4, the burner assembly 62 connected to the fuel supply tank 60 is then placed within the hanger assembly 30 such that the fuel supply tank is located in the basket 58 formed in the hanger assembly 30 and the lip 72 of the burner base 70 of the burner assembly 62 rest upon the hooks 53 of the hanger assembly 30.

Once assembled as explained hereinabove and the user is ready to cook or warm food in a boat, for example, one of the seats of the boat could be removed and the stem 16 of the support frame 4 of the stove 2 is inserted in the pedestal or opening 17. At this time, the user will turn the knob 66 of the valve/orifice assembly 64 to release fuel from the fuel supply tank 60 to light the burner 80. As in apparent, the wind shield 84 will guard against a gust of wind extinguishing the cooking flame. The user will then place the pot or pan 82 with food or liquid therein within the hanger assembly 30 such that the bottom of the pot or pan 82 rests upon the second circular ring 52, as shown in FIG. 3, to cook or warm the food or liquid within the pot or pan 82. As best seen in FIG. 3, the first circular ring 50 of the hanger assembly 30 engages the outer periphery of the pot or pan 82 to prevent the possible sliding of the pot or pan 82. If there is any pitching or rolling of the boat with the frame 4 moving with the pedestal or opening 17, the gimbal ring 20 and hanger assembly will pivot about the respective gimbals or bearings 22 and/or 26 to maintain the pot or pan 82 and the food or liquid therein in a substantially level condition. This is primarily so in view of the fact that the axis of the pedestal or opening 17 within the boat and the axis of the gimbal ring 20 are in vertical alignment. The same principles would apply if the cooking stove 2 were mounted in a recreational vehicle or in any other non-stable environment. It is apparent that the cooking stove 2 could also be used in a stable, stationary, environment.

While the above description constitutes a preferred embodiment of the present invention, it will be appreciated that the invention is susceptible to modification, variation and change without departing from the proper scope and fair meaning of the accompanying claims. For example, the first and second gimbals or bearings 22 and 26 could both be mounted on the upper edge of the gimbal ring 20 or one of the gimbals or bearings 22 or 26 could be mounted on the upper edge of the gimbal ring 20 with the other of the gimbals or bearings 22 or 26 could be mounted on the lower edge of the gimbal ring 20, instead of only on the lower edge of the gimbal ring 20 as shown in the drawings.

What is claimed is:

1. A portable cooking stove for use in motion filled, non-stable environments for cooking food in a pot and for minimizing the spilling of food from the pot, said stove including means for supporting the pot, said stove comprising:
    a support frame including a pair of side members having inturned upper protrusions, and a bottom member having means associated therewith for supporting the support frame in a normal vertical posture;
    a gimbal ring including a pair of first gimbals spaced one hundred eighty degrees from each other, and a pair of second gimbals spaced one hundred eighty degrees from each other with adjacent first and second gimbals being respectively spaced ninety degrees around said ring, each of said first and second gimbals having an opening therein, and each of said openings in each said second gimbal being adapted for receiving a respective inturned upper protrusion of said side members of said support frame;
    a hanger assembly including a pair of legs, each having an upper section having an outturned protrusion, an intermediate section having the means for supporting the pot and a lower section, each of said openings in each said first gimbal being adapted for receiving a respective outturned protrusion of said upper section of said hanger assembly;
    a fuel supply source mounted within said lower section of said hanger assembly;
    valve means connected to said fuel supply source; and
    a burner having a plurality of fuel emitting openings therein connected to said valve means.

2. The portable stove of claim 1 wherein said means associated with said bottom member of said support frame for supporting the support frame in a normal vertical posture has an axis which is in vertical alignment with the axis of said gimbal ring.

3. The portable stove of claim 2 wherein said means for supporting said support frame in a normal vertical posture includes a pedestal.

4. The portable stove of claim 3 wherein said means for supporting the pot is a ring having a plurality of spaced hooks extending inwardly therefrom.

5. The portable stove of claim 4 further including a burner base associated with said burner, said burner base having a lip at its periphery and adapted to engage and rest upon said hooks to stabilize said fuel supply tank, said burner and said burner base.

6. A portable stove for detachable connection to a structural member attached to a generally horizontal floor of a vehicle which may be subject to move substantially in any direction, said stove including means for supporting a cooking vessel, said stove comprising:
    a support frame including a pair of side members having inturned upper protrusions, and a bottom member having means associated therewith for supporting the support frame within the structural member in a normal vertical posture;
    a gimbal ring including a pair of first gimbals spaced one hundred eighty degrees from each other, and a pair of second gimbals spaced one hundred eighty degrees from each other with adjacent first and second gimbals being respectively spaced ninety degrees around said gimbal ring, each of said first and second gimbals having an opening therein, and each of said openings in each said second gimbal being adapted for receiving a respective inturned upper protrusion of said side members of said support frame;
    a hanger assembly including a pair of legs, each having an upper section having an outturned protrusion, an intermediate section having the means for supporting the cooking vessel and a lower section, each of said openings in each said first gimbal being adapted for receiving a respective outturned protrusion of said upper section of said hanger assembly;
    a fuel supply source mounted within said lower section of said hanger assembly;
    valve means connected to said fuel supply source; and
    a burner assembly having a plurality of fuel emitting openings therein connected to said valve means.

7. The portable stove of claim 6 wherein said means for supporting said support frame has an axis which is in vertical alignment with the axis of said gimbal ring.

8. The portable stove of claim 7 wherein said means for supporting said support frame includes a pedestal extending upwardly from the horizontal floor of the vehicle.

9. The portable stove of claim 8 wherein said means for supporting the cooking vessel is a ring having a plurality of hooks extending inwardly therefrom.

10. The portable stove of claim 9 wherein said burner assembly includes a burner and burner base and wherein said hooks on said ring engage said burner base to stabilize the burner assembly.

* * * * *